(12) United States Patent  (10) Patent No.: US 7,726,569 B2
Ishii  (45) Date of Patent: Jun. 1, 2010

(54) METHOD FOR DETERMINING SAMPLING TIMING AND IMAGE READING APPARATUS USING THE SAME

(75) Inventor: Hirofumi Ishii, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 908 days.

(21) Appl. No.: 11/401,954

(22) Filed: Apr. 12, 2006

(65) Prior Publication Data

US 2007/0125858 A1    Jun. 7, 2007

(30) Foreign Application Priority Data

Dec. 5, 2005    (JP) ............................. 2005-351245

(51) Int. Cl.
*G06K 7/10* (2006.01)
*G06K 7/14* (2006.01)
(52) U.S. Cl. ..................... 235/454; 345/213; 348/537
(58) Field of Classification Search ............... 235/435, 235/439, 454; 250/200, 216, 566, 568; 345/213
See application file for complete search history.

(56) References Cited

U.S. PATENT DOCUMENTS 6,340,993 B1 * 1/2002 Hasegawa et al. ........... 348/572

| | | | |
|---|---|---|---|
| 2003/0156107 A1 * | 8/2003 | Sakashita | 345/213 |
| 2004/0100583 A1 * | 5/2004 | Yoneno | 348/537 |
| 2005/0162708 A1 * | 7/2005 | Takahashi | 358/471 |
| 2005/0275436 A1 * | 12/2005 | Shih et al. | 327/94 |

FOREIGN PATENT DOCUMENTS

JP    A-06-255146    8/1994
JP    A-10-290399    10/1998

* cited by examiner

*Primary Examiner*—Steven S Paik
*Assistant Examiner*—William M Anderson, Jr.
(74) *Attorney, Agent, or Firm*—Oliff & Berridge, PLC

(57) ABSTRACT

An image reading apparatus comprises: a photoelectric converter that converts image data into an electric signal and outputs the image data; a clock controller that generates a plurality of sampling signals having different phases to sample a level of an output signal of the photoelectric converter; a phase determination unit that compares signal levels in a sampling order, each of the signals obtained by sampling, using a respective sampling signal, the output signal of the photoelectric converter, so as to determine an optimum phase of the plurality of the sampling signals when a condition is fulfilled in which an absolute value of a variation between signal levels being compared is less than a threshold value; a storage unit in which the optimum phase is stored; and a sampling unit that samples the output signal of the photoelectric converter using the sampling signal having the optimum phase.

6 Claims, 4 Drawing Sheets

METHOD FOR DETERMINING SAMPLING TIMING AND IMAGE READING APPARATUS USING THE SAME

BACKGROUND

1. Technical Field

The present invention relates to a technique for reading out an image by optically reading out image information from an original document, converting the image information into an electronic signal, and sampling the level of the electronic signal at a prescribed timing.

2. Related Art

In an image reading apparatus such as a scanner, the image of a document is read by optically reading the document with a CCD (Charge Coupled Device) image sensor to obtain image information and converting the image information into an electronic signal and sampling the level of the electronic signal at a prescribed sampling timing, which may also be called "sampling point" hereinafter.

SUMMARY

An image reading apparatus according to an embodiment of the present invention includes: a photoelectric converter that converts image data obtained by optically reading a document into an electric signal and outputs the image data; a clock controller that generates a plurality of sampling signals having different phases to sample a level of an output signal of the photoelectric converter; a phase determination unit that compares signal levels of the output signal of the photoelectric converter, in a sampling order, each of the signals obtained by sampling, using a respective sampling signal, so as to determine an optimum phase of the plurality of sampling signals when a condition in which an absolute value of a variation between signal levels being compared is less than a threshold value is fulfilled; a storage unit in which the optimum phase determined by the phase determination unit is stored; and a sampling unit that samples the output signal of the photoelectric converter using the sampling signal having the optimum phase stored in the storage unit.

BRIEF DESCRIPTION OF THE DRAWINGS

Embodiments of the present invention will now be described in detail based on the following figures, wherein.

DETAILED DESCRIPTION

The embodiments according to the present invention will be described hereinafter by referring to the attached drawings.

(A: Structure)

Figure 1:
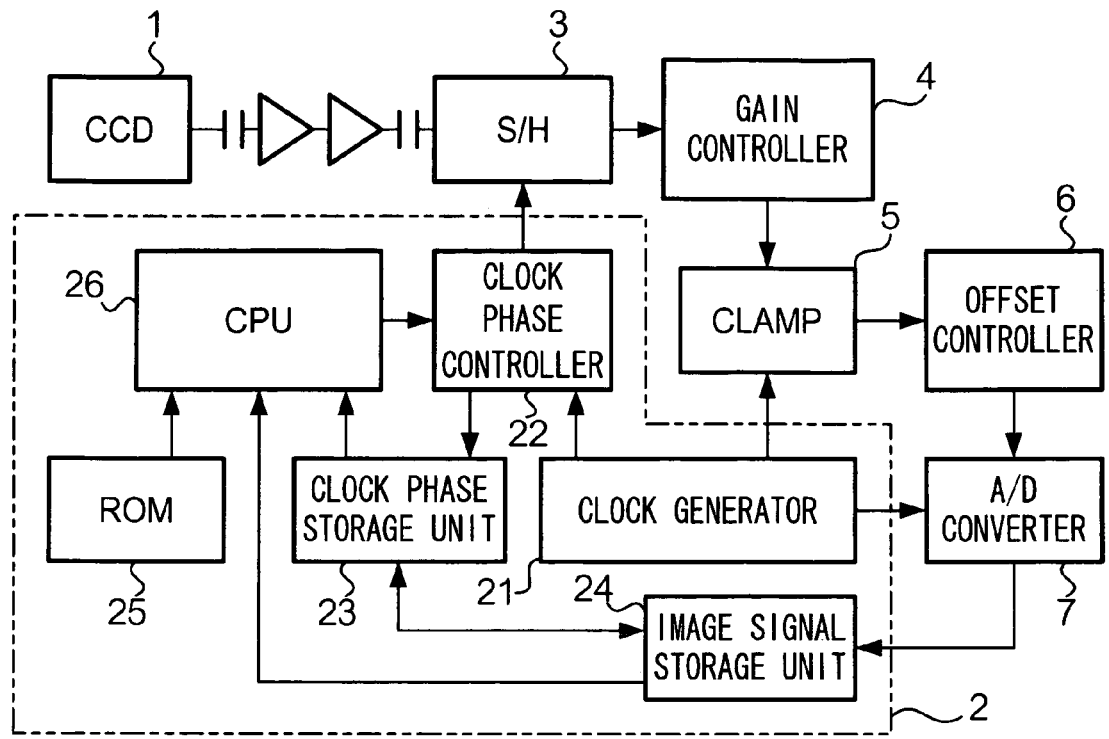
FIG. 1 is an embodiment of the image reading apparatus according to the present invention.
Figure 2:
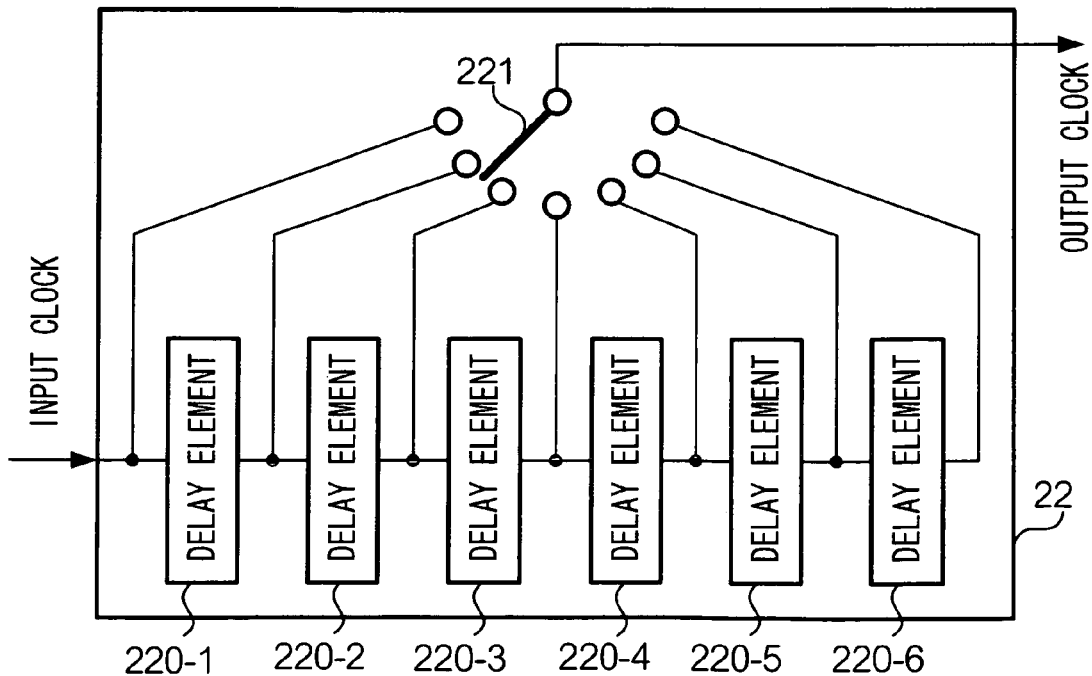
FIG. 2 is a block diagram of a clock phase controller, a component used in constructing the image reading apparatus shown in FIG. 1.

FIG. 1 is a block diagram illustrating the structure of an image reading apparatus according to an embodiment of the present invention. As shown here, the image reading apparatus comprises: a CCD image sensor 1 (called hereinafter simply as "CCD"), which is a photoelectric converter for converting image information optically read from an original document into an electric signal (which is also called "image signal" hereinafter) and for outputting it; a clock controller 2; a sample holding circuit 3 (shown in FIG. 1 as S/H); a gain controller 4; a clamp circuit 5 (CLAMP) for clamping a standard level; an offset controller 6 for adjusting an offset of the standard level; and an A/D converter 7 for carrying out A/D conversion to the image signal and for outputting it.

The clock controller 2 shown in FIG. 1 comprises: a clock generator 21 for generating a clock of a prescribed cycle; a clock phase controller 22 for receiving the clock from the clock generator 21 to produce plural sampling signals having different phases; a clock phase storage device 23, which is a RAM (Random Access Memory) for storing data representing an optimum sampling signal phase among those produced by the clock generator 21; an image signal storage device 24, which is a RAM for storing image signals digitally converted via the A/D converter 7; and a CPU 26 for controlling the operation of the above components in accordance with a program stored in a ROM 25. Here, "the optimum sampling signal phase" is a sampling signal phase that can cancel the timing deviance possibly resulting from quality variation in the components constructing various circuits for generating clocks. While, in this embodiment, the clock phase storage unit 23 and the image signal storage unit 24 are comprised of respective RAMs, they may share a single RAM by assigning different storage areas of the RAM for respectively storing phase values to be set and image signals thereby making the single RAM function as both clock phase storage unit 23 and image signal storage unit 24.

The clock phase controller 22 shown in FIG. 1 comprises plural (six in this embodiment) delay elements 220-$n$ ($n$=1~6) serially connected in a multistage manner such that it can output clocks having different phases by selecting the number of the delay elements through which an inputted clock passes by operating a switching device 221. In the following description of one embodiment, the phase of the output clock is set to delay by 1 nsec (nanosecond) to each additional delay element through which the inputted clock passes. Thus, according to the present embodiment, seven different output clocks having phases differing by an increment of 1 nsec can be produced within the range of −3 to +3 nsec relative to a standard output clock, which is defined as an output clock that has passed three delay elements, by operating the switching device 221.

According to the present embodiment, seven parameters SP(m) representing switching patterns of the switching device 221, where "m" is the number of the delay elements to be passed +1 and in the range of 1 to 7, are preliminarily written in the ROM 25. Thus, the CPU 26 can read out these parameters from the ROM 25 and make the clock phase controller 22 produce seven different output clocks having phases differing with an increment of 1 nsec and ranging from −3 to +3 nsec by operating the switching device 221 in accordance with the read out parameter. In the following description, the parameters SP(1)~SP(7) are also called sampling timing parameters.

While the present embodiment handles a case where the clock phase controller 22 produces seven different output clocks having phases differing with an increment of 1 nsec and ranging from −3 to +3 nsec, the increment is not limited to 1 nsec, and can be a smaller value such as 0.5 nsec. While different output clocks having phases ranging from −3 to +3 nsec are produced in the present embodiment, it is known that if the range is far wider than ±2 nsec, adverse effects may occur in the outputted images. The upper or lower limit for the clocks can be suitably determined by judging the quality of the output image or the like so as to avoid generation of adverse effects.

Figure 3A:
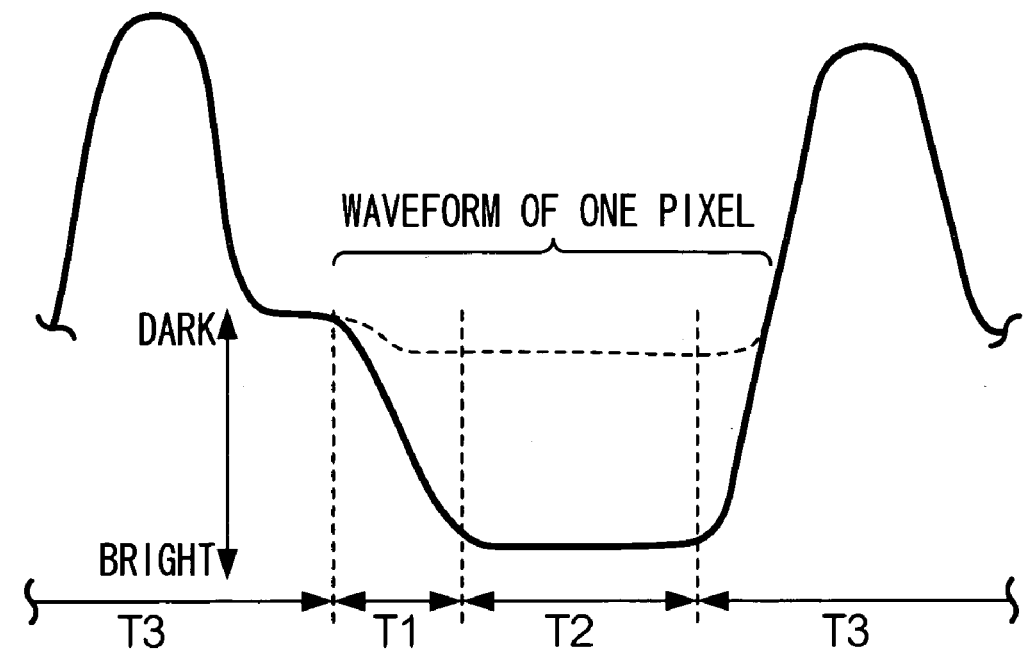
FIGS. 3A and 3B are graphs showing an output waveform of a CCD image sensor.

FIG. 3A shows an ideally configured waveform corresponding to one pixel outputted from the CCD 1, which can be generally categorized into three periodic patterns, that is, an output delay period T1, a stable output period T2, and a next pixel preparation period T3.

As is clear from FIG. 3A, in the output delay period T1 and the next pixel preparation period T3, a signal level changes significantly, while, in the stable output period T2, the signal level is almost constant. Therefore, it is desirable to carry out sample holding in the stable output period T2 to obtain stable output. For this reason, sampling timing for carrying out sample holding is generally set up in the stable output period T2.

Figure 3B:
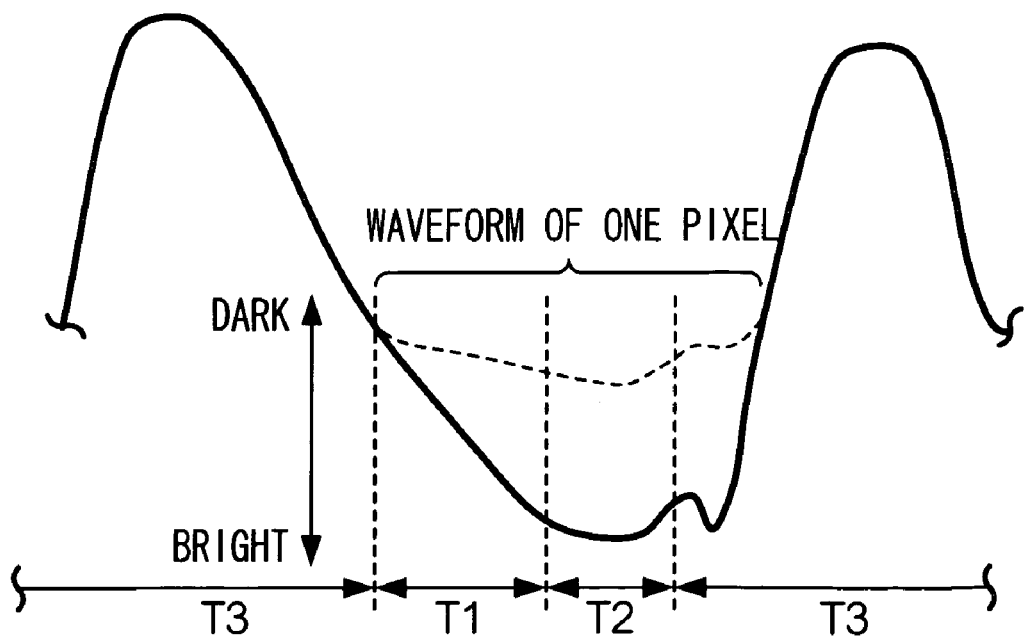

However, in order to increase the operation speed of the image reading apparatus, it is necessary to expedite the next pixel preparation process, which results in shortening of the stable output period T2 by a degree corresponding to the expedition of the next pixel preparation, as shown in FIG. 3B. In a situation where the stable output period T2 is shortened, and if certain deviance is created between the CCD output timing and the sampling timing due to quality variation in the components constructing various circuits for generating clocks, the sample holding may be carried out in either the output delay period T1 or the next pixel preparation period T3. It may also cause output power difference even for the same light amount input due to power source ripple noises or timing jitter caused by a frequency spread system used to avoid EME.

In the image reading apparatus according to the present embodiment, the CPU 26 determines a setup phase value, that can cancel the deviance resulting from quality variation in the components used in constructing various circuits for generating clocks, when a command for executing image reading is inputted; thereby canceling the above deviance. The process in which the CPU 26 determines sampling timing in accordance with the above program will be described referring to the drawings.

(B: Operation)

The image reading apparatus is provided with a white reference plate, not shown here, for executing shading compensation process by reading image information of the same light amount, similar to a usual image reading apparatus. In the process of determining the sampling timing according to the present embodiment, the CCD 1 reads image information of the same light amount in the first place.

Figure 4:
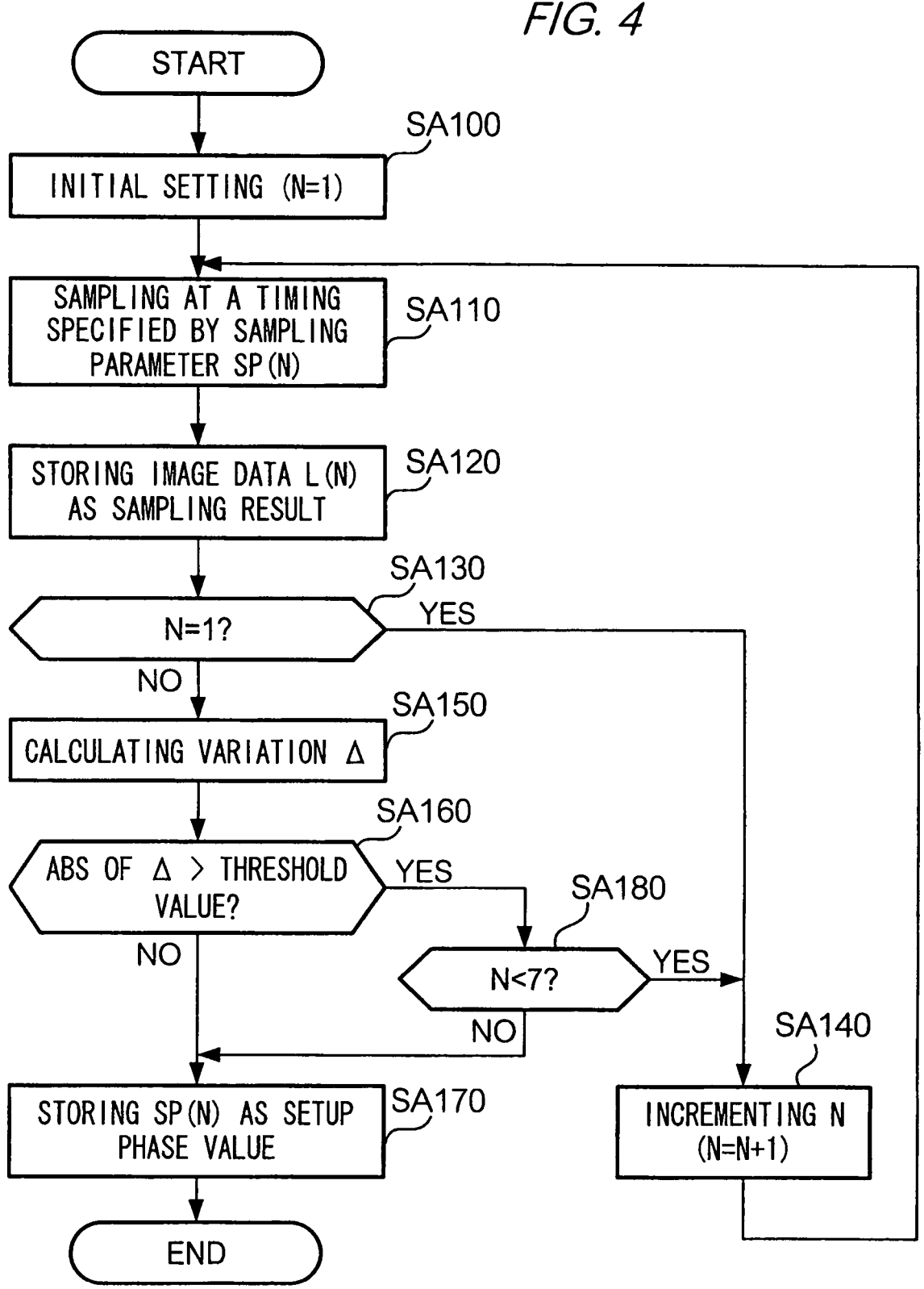
FIG. 4 is a flowchart showing a sampling timing determination process carried out by the image reading apparatus.

Meanwhile, the CPU 26 executes initial setting in the first place in step SA100, as shown in FIG. 4. The initial setting includes setting a prescribed gain into the gain controller 4, in addition to inputting initial value ("1" in this embodiment) into a counter N that is shown in FIG. 4.

Then the CPU 26 reads out a sampling parameter corresponding to the counter number N. i.e., SP(N), from the ROM 25, and samples signal level of the output signal by using a sampling signal having a phase corresponding to the sampling parameter in step SA110. More specifically, the CPU 26 switches the switching device 221 in accordance with the sampling parameter to make the clock phase controller 22 produce a sampling signal having a phase corresponding to the sampling parameter. Then the CPU 26 makes the sample holding circuit (S/H) 3 carry out sample holding by using the sampling signal to obtain a signal level.

Then the CPU 26 stores the sampling result of step SA110 by writing down data representing the obtained signal level in connection with the counter number N onto the image signal storage unit 24 in step SA120. More specifically, the CPU 26 quantizes the sampled image signal that has passed through devices such as the gain controller 5 and offset controller 6 shown in FIG. 1 by the A/D converter 7, and writes down the quantized image data in connection with the counter number N onto the image signal storage unit 24. In the following, the image data written in the image signal storage unit 24 in connection with the counter number N is referred to as "image data L(N)".

In step SA130 following step SA120, the CPU 26 judges if the counter number N is the initial value, i.e., "1", or not. And if the judgment in step SA140 is "YES", the CPU 26 increments the counter number N in step SA140, and repeats the process from step SA130. If the judgment in step SA140 is "NO", on the contrary, the CPU 26 calculates the difference between the image data L(N) stored in the image signal storage unit 24 and the previous image data L(N−1) sampled at a timing of one step ahead of the image data L(N) as variation Δ in step SA150, and judges if the absolute value of the variation Δ exceeds the prescribed threshold value (e.g. "1" in this embodiment) that was preliminarily written on the ROM 25 or not, in step SA160.

If the judgment in step SA160 is "NO", meaning that the absolute value of the variation Δ calculated in step SA150 is not more than the prescribed threshold value, the CPU 26 picks up a sampling parameter SP(N) corresponding to the current counter number N as the above setup phase value and writes it down in the clock phase storage unit (shown in FIG. 1) in step SA170 following step SA160 to finish the sampling timing determination operation. According to the above-described process, a sampling parameter is determined as the setup phase value and stored in the clock phase storage unit, in which the absolute value of signal level variation Δ relative to the previous sampling parameter becomes not more than the prescribed threshold value.

If judgment in step SA160 is "YES", then the CPU 26 judges whether sampling is completed at all the prescribed sampling timings or not, that is, whether the current counter number N is less than 7 or not, in step SA180. And if the judgment in step SA180 is "YES", the CPU 26 increments the counter number by one in step SA140 and repeats the process from step SA110, while if the judgment in step SA180 is "NO", the CPU 26 executes the above process of step SA170.

Figure 5:
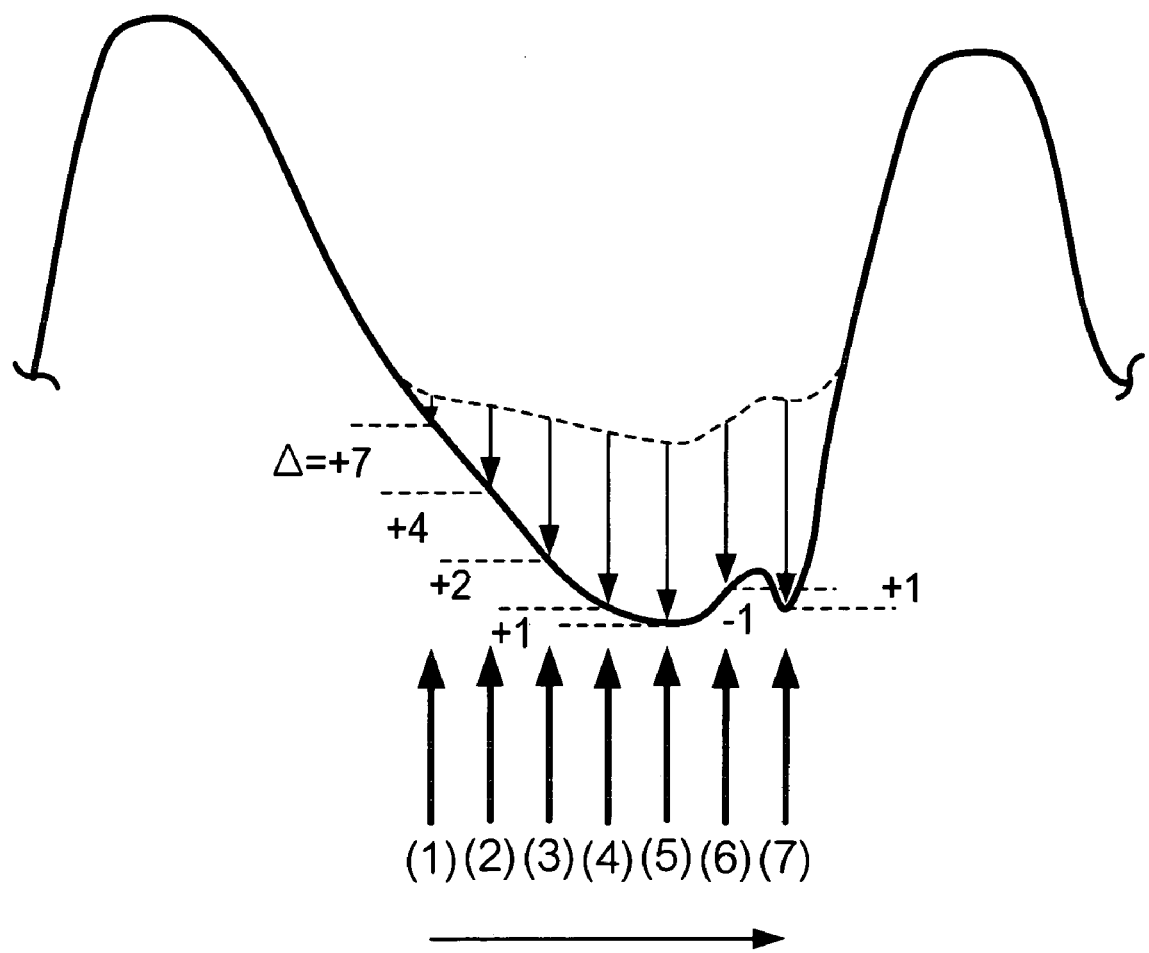
FIG. 5 is a graph showing signal levels to be sampled in the sampling timing determination process and variations between respective phases.

For example, if the sampling is carried out in the timings (1) to (7) shown in FIG. 5, in the sampling timing determination process described above, the fifth sampling parameter SP(5) is written in the clock phase storage unit 23 as the setup phase value because the sixth sampling timing depicted by (5) of FIG. 5 is the only one to provide a variation Δ relative to the previous sampling timing whose absolute value is not larger than the prescribed threshold value. Then, in the following process of reading out the image information, a clock represented by the setup phase value thus stored in the clock phase storage unit 23 is employed as a clock for the sampling signal. Since the judgment for the sixth sampling timing in step SA160 becomes "YES", a seventh sampling is not subjected to the process through step SA110 to SA160.

Meanwhile, in the technique disclosed in the above Patent Document 2, if the signal level of the seventh sampling timing is larger than that of the sixth sampling timing, the seventh sampling timing is employed as the optimum sampling timing. However, as is clear in FIG. 5, in the area adjacent to the seventh sampling timing, signal level fluctuation is larger than the area adjacent to the sixth sampling timing, which is determined as the optimum sampling timing by the image reading apparatus according to the present embodiment. Therefore, the selection of the seventh sampling timing as the optimum sampling timing may lead to a situation where erroneous timing deviance possibly resulting from quality variation in the components used in constructing various circuits for generating clocks cannot be cancelled.

In the image reading apparatus according to the present embodiment, on the other hand, it is possible to carry out the sample holding process at a sampling timing to cancel erroneous timing deviance resulting from quality variation in the components used in constructing various circuits for generating clocks, by sample holding the signal level of the output signal that is obtained by the CCD when it captures image information from a white reference plate using plural sampling signals having different phases, by sequentially comparing variations between the signal levels in the sampling order, and by determining a phase where the variation $\Delta$ is not more than a prescribed threshold value as the clock phase to be used in actual image capturing.

While the present embodiment handles a case where the threshold value for determining the optimum sampling signal phase is written in the ROM 25, it is possible to write it in a rewritable nonvolatile memory such as an EEPROM 25 which the image reading apparatus is equipped with. Thus, it is possible to minutely adjust the optimum sampling timing for each individual image reading apparatus by arbitrarily rewriting the threshold value stored in the EEPROM 25. While the present embodiment handles a case where the threshold value is set as "0", it can be set as positive or negative. It is also possible to write plural threshold values in the nonvolatile memory so that the values can be selectively used for the above sampling timing determination process. This method allows minute adjustment for selecting a position in the CCD output waveform for carrying out sampling. For example, if an image reading apparatus has a tendency for sampling timing changes (for e.g., when the sampling timing becomes quicker) as a certain time has passed after turning on the power, the sampling timing can be set by using a threshold value in which the amount of such change is taken into consideration.

(C: Modification)

Although an embodiment according to the present invention has been described, modification is duly possible as described in the following embodiments.

(1) While the above embodiment handles a case where seven sampling signals are produced, it is possible to produce sampling signals of more than or less than seven so long as it is not less than two for determination of the optimum sampling timing. That is, it is only necessary to produce plural sampling signals so as to allow determination of the optimum sampling timing among them. To increase the number of the sampling signals, it is only necessary to increase the number of the delay elements included in the clock phase controller 22, and to decrease the number of the sampling signals, also it is only necessary to decrease the number of the delay elements included in the clock phase controller 22.

(2) In the above embodiment, the phase of the sampling signal is determined as the phase of a sampling signal in which variation $\Delta$ of a signal level is not more than a prescribed level. However, in a case where there are plural phases to satisfy the above condition, the optimum sampling signal phase is determined by using the following criteria: "a phase where a sign of the variation $\Delta$ first changes", "a phase where the absolute value of the variation $\Delta$ first becomes no more than the prescribed threshold value", "a phase where signal level is maximum", or "a median of the plural phases." It is also possible to determine a phase where the absolute value of signal level variation $\Delta$ is minimum as the optimum sampling signal phase.

(3) The above embodiment handles a case where the sampling timing determination process is carried out prior to actual image reading each time a command for starting image reading is issued. However, when a long time is required to carry out the sampling timing determination process, and it is necessary to have a higher productivity, it is possible to make the CPU 26 carry out the process when the image reading apparatus is turned on. It is also possible to carry out the sampling timing determination process repeatedly at a certain time interval after the image reading apparatus is turned on. It is also possible to construct the clock phase storage unit 23 with a rewritable nonvolatile memory such as an EEPROM 25 so that the setup phase values are stored in it by making the CPU 26 carry out the sampling timing determination process at the time of a factory shipment. It is also possible to update the stored data in the clock phase storage unit 23 when replacing any components of the image reading apparatus by making the CPU 26 carry out the sampling timing determination process. Since the EEPROM 25 is a nonvolatile memory, setup phase values stored at the time of factory shipment or component replacement are not erased when the power for the image reading apparatus is turned off. The setup phase values are reusable until another sampling timing determination process is commanded.

In the above embodiment, currently optimum setup phase values are set by storing the phase setup value determined by carrying out the sampling timing determination process in the clock phase storage unit 23. However, it is possible to provide sensors for sensing an environmental temperature or power source voltage, so that the environmental temperature or power source voltage during the sampling timing determination process is stored in connection with the optimum setup phase values, and the sampling timing determination process is carried out for updating when the difference in the current environmental temperature or power source voltage from those sensed during the sampling timing determination process exceeds a prescribed threshold value. This process enables to automatically set the optimum signal timing in accordance with a change in environmental temperature or power source voltage.

(4) While the above embodiment handles a case where the program to make the CPU 26 carry out the sampling timing determination process according to the present invention is preliminarily installed into the image reading apparatus, it is possible to distribute the above program via a storage medium such as a CD-ROM 25 readable by a computer and storing the program, or via a telecommunication line such as the Internet allowing download of the program, and installing the program into a common image reading apparatus for allowing the device to operate in accordance with the program. This process enables the common image reading apparatus to carry out the sampling timing determination process of the present invention (to function in the same manner as the image reading apparatus according to the present invention).

An image reading apparatus according to an embodiment of the present invention comprises: a photoelectric converter that converts image data obtained by optically reading a document into an electric signal and outputs the image data; a clock controller that generates a plurality of sampling signals having different phases to sample a level of an output signal of the photoelectric converter; a phase determination unit that compares signal levels in a sampling order, each of the signals obtained by sampling using a respective sampling signal, the output signal of the photoelectric converter, so as to determine an optimum phase of the plurality of sampling signals when a condition is fulfilled in which an absolute value of a variation between signal levels being compared is less than a threshold value; a storage unit in which the optimum phase determined by the phase determination unit is stored; and a sampling unit that samples the output signal of the photoelectric converter using the sampling signal having the optimum phase stored in the storage unit.

According to the embodiment, there is provided a technique that enables to obtain a sampling timing capable of minimizing the output variation even when the quality variation among components creates deviance between the sampling timing and the timing of the output signals from the CCD image sensor.

In another embodiment, when a plurality of phases of the sampling signals which satisfy the condition are found, the phase determination unit may determine a phase that is found first as the optimum phase.

In yet another embodiment, when a plurality of phases of the sampling signals which satisfy the condition are found, the phase determination unit may determine the optimum phase where a sign of the variation changes.

In yet another embodiment, when a plurality of phases of the sampling signals which satisfy the condition are found, the phase determination unit may determine the optimum phase by specifying a phase at which a signal level is the largest among the sampling signals satisfying the condition.

In yet another embodiment, when a plurality of phases of the sampling signals which satisfy the condition are found, the phase determination unit determines the optimum phase by specifying a phase which appears inside in a time region.

According to any one of these embodiments, even when plural phases have an absolute value of the variation not more than the prescribed threshold value, it is possible to determine one of the plural phases as the setup phase value representing an optimum sampling timing.

In yet another embodiment, the image reading apparatus may further comprise: a controller that causes, in response to an instruction by a user to start scanning an image; a clock controller; and a phase determination unit to determine the optimum phase of the plurality of sampling signals, and cause a photoelectric converter and the sampling unit to read the image.

According to this embodiment, the sampling timing determination process is consistently carried out prior to the image reading process so that the sampling is carried out at an optimal sampling timing suitable for the current condition.

In yet another embodiment, the storage unit may include a nonvolatile memory.

According to this embodiment, by determining an optimum sampling timing at a time of factory shipment, for example, it is not necessary to carry out the sampling timing determination process each time a command for the image reading process is issued, or when the image reading device is turned on, and the sampling can be carried out at a sampling timing represented by the setup phase value stored in the nonvolatile memory at the time of factory shipment.

According to yet another embodiment, an image reading apparatus for reading an image by sampling an output signal of a photoelectric converter that converts image obtained by optically reading a document into an electric signal and outputs the signal, the image reading apparatus comprises: a phase setting unit that sets a plurality of phases of a sampling signal used for sampling a signal level of the output signal of the photoelectric converter; a phase determination unit that compares signal levels in a sampling order, each of the signals obtained by sampling, using a respective sampling signal set in a phase setting unit, the output signal of the photoelectric converter, so as to determine an optimum phase of the plurality of the sampling signals when a derivation of signal levels being compared is at a minimum; a storage unit in which the optimum phase determined by the phase determination unit is stored; and a sampling unit that samples the output signal of the photoelectric converter at a timing defined by the optimum phase stored in the storage unit.

According to another aspect of the present invention, a method for determining a sampling timing in an image reading apparatus includes, a photoelectric converter that converts image data obtained by optically reading a document into an electric signal and outputs the image data, and a sampling unit that samples the output signal of the photoelectric converter at a predetermined timing. The method comprises: generating a plurality of sampling signals having different phases to sample a level of an output signal of the photoelectric converter; comparing signal levels in a sampling order, each of the signals obtained by sampling, using a respective sampling signal, the output signal of the photoelectric converter, so as to determine an optimum phase of the plurality of the sampling signals when a condition is fulfilled in which an absolute value of a variation between signal levels being compared is less than a threshold value.

In another embodiment, the method comprises: setting a plurality of phases of a sampling signal used for sampling a signal level of the output signal of the photoelectric converter; comparing signal levels in a sampling order, each of the signals obtained by sampling, using a respective sampling signal set in the setting step, the output signal of the photoelectric converter, so as to determine an optimum phase of the plurality of the sampling signals when a derivation of signal levels being compared is at a minimum.

In yet another embodiment, it is possible to distribute a program to a controller for controlling a component of a common type of image reading apparatus to make it carry out any one of the embodiments of the methods described above. By installing the program to the common type of image reading apparatus and making the controller operate in accordance with the program, the common image reading apparatus can function in the same manner as the image reading apparatus according to the present invention. It is possible to distribute the above program via a storage medium such as a CD-ROM (Compact Disc-Read Only Memory) readable by a computer and storing the program, or via a telecommunication line such as the Internet allowing download of the program.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for application in a variety of embodiments and modifications that are suited to a particular use that is contemplated. It is intended that the scope of the invention be defined by the following claims and their equivalents.

The entire disclosure of Japanese Patent Application No. 2005-351245 filed on Dec. 5, 2006, including specification, claims, drawings and abstract are incorporated herein by reference in their entirety.

What is claimed is:

1. An image reading apparatus comprising:
a photoelectric converter that converts image data obtained by optically reading a document into an electric signal and outputs the image data;
a clock controller that generates a plurality of sampling signals having different phases to sample a level of an output signal of the photoelectric converter;
a phase determination unit that compares signal levels in a sampling order, each of the signals obtained by sampling, using a respective sampling signal, the output signal of the photoelectric converter, so as to determine an optimum phase of the plurality of the sampling signals when a condition is fulfilled in which an absolute value of a variation between signal levels being compared is less than a threshold value and stops comparing subsequent signal levels in the sampling order;
a storage unit in which the optimum phase determined by the phase determination unit is stored; and
a sampling unit that samples the output signal of the photoelectric converter using the sampling signal having the optimum phase stored in the storage unit.

2. The image reading apparatus according to claim 1, further comprising: a controller that causes, in response to an instruction of a user to start scanning an image, a clock controller and a phase determination unit to determine the optimum phase of the plurality of sampling signals, and cause a photoelectric converter and the sampling unit to read the image.

3. The image reading apparatus according to claim 1, wherein the storage unit comprises a nonvolatile memory.

4. An image reading apparatus for reading an image by sampling an output signal of a photoelectric converter that converts image obtained by optically reading a document into an electric signal and outputs the signal, the image reading apparatus comprising:
a phase setting unit that sets a plurality of phases of a sampling signal used for sampling a signal level of the output signal of the photoelectric converter;
a phase determination unit that compares signal levels of the output signal of the photoelectric converter, in a sampling order, each of the signals obtained by sampling, using a respective sampling signal set in the a phase setting unit, so as to determine an optimum phase of the plurality of the sampling signals when a variation of signal levels being compared is at a minimum;
a storage unit in which the optimum phase determined by the phase determination unit is stored; and
a sampling unit that samples the output signal of the photoelectric converter at a timing defined by the optimum phase stored in the storage unit.

5. A method for determining a sampling timing in an image reading apparatus which includes a photoelectric converter that converts image data obtained by optically reading a document into an electric signal and outputs the image data and a sampling unit that samples the output signal of the photoelectric converter at a predetermined timing, the method comprising:
generating a plurality of sampling signals having different phases to sample a level of an output signal of the photoelectric converter;
comparing signal levels of the output signals of the photoelectric converter, in a sampling order, each of the signals obtained by sampling, using a respective sampling signal, so as to determine an optimum phase of the plurality of the sampling signals when a condition is fulfilled in which an absolute value of a variation between signal levels being compared is less than a threshold value and stops comparing subsequent signal levels in the sampling order.

6. A method for determining a sampling timing in an image reading apparatus which includes a photoelectric converter that converts image data obtained by optically reading a document into an electric signal and outputs the image data and a sampling unit that samples the output signal of the photoelectric converter at a predetermined timing, the method comprising:
setting a plurality of phases of a sampling signal used for sampling a signal level of the output signal of the photoelectric converter;
comparing signal levels of the output signal of the photoelectric converter, in a sampling order, each of the signals obtained by sampling, using a respective sampling signal set in the setting step, so as to determine an optimum phase of the plurality of the sampling signals when a variation of signal levels being compared is at a minimum.

* * * * *